United States Patent Office 3,655,669
Patented Apr. 11, 1972

3,655,669
3-CYCLIC IMIDES OF 3-AMINO-2,4,6-
TRIIODOHYDROCINNAMIC ACIDS
James H. Ackerman, Bethlehem, N.Y., assignor to Sterling
Drug Inc., New York, N.Y.
No Drawing. Original application Mar. 25, 1968, Ser. No.
715,584. Divided and this application May 26, 1969,
Ser. No. 827,954
Int. Cl. C07d 31/32
U.S. Cl. 260—281         4 Claims

ABSTRACT OF THE DISCLOSURE 3-amino-2,4,6-triiodohydrocinnamic acid and α-alkyl or α-phenyl derivatives thereof react with dibasic acid anhydrides to give the corresponding 3-cyclic imides (A), which can be hydrolyzed to the corresponding anilic acids (B). The latter can be further alkylated on the nitrogen atom. Compounds A and B are useful as cholecystographic agents.

---

This application is a division of my copending application, Ser. No. 715,584, filed Mar. 25, 1968, now abandoned.

This invention relates to iodinated hydrocinnamic acid derivatives, and more particularly is concerned with cyclic imide derivatives of 3-amino-2,4,6-triiodohydrocinnamic acid and α-alkyl or α-phenyl derivatives thereof, with the corresponding anilic acids, and with methods for the preparation of the foregoing compounds.

The compounds of the invention possess the following structural formulas:

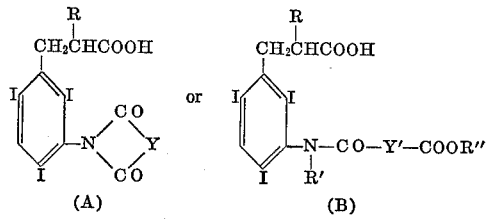

wherein R is hydrogen, lower-alkyl or phenyl; R' is hydrogen, lower-alkyl, or hydroxy-lower-alkyl; R'' is hydrogen or lower-alkyl; Y is a lower-alkyene group wherein two or three carbon atoms separate the carbonyl groups, or a 1,3-propylene group wherein the 2-carbon atom is replased by O, S, SO or SO$_2$; and Y' is an alkylene bridge having from two to eight carbon atoms or such a group interrupted by from one to thee members selected from O, S, SO and SO$_2$, said members, when more than one, being separated by at least two carbon atoms.

When R, R' or R'' in the above Formulas A and B stand for lower-alkyl, the lower-alkyl group has from one to six carbon atoms, thus including, for example, methyl, ethyl, propyl, isopropyl, butyl, isobutyl, pentyl, hexyl, and the like.

In the above Formula A, Y stands for a lower-alkylene group wherein two or three carbon atoms separate the carbonyl groups and this can be an ethylene or propylene group optionally substituted by lower-alkyl. The group Y can have from two to six carbon atoms and includes such groups as —CH$_2$CH$_2$—, —CH$_2$CH$_2$CH$_2$—,

—CH(CH$_3$)CH$_2$—

—CH$_2$CH(CH$_3$)CH$_2$, —CH(CH$_3$)CH(CH$_3$)—,

—CH—CH(C$_2$H$_5$)CH$_2$—

—CH(CH$_3$)CH$_2$CH$_2$—,

—CH(CH$_3$)CH(CH$_3$)CH(CH$_3$)—

—CH$_2$C(CH$_3$)$_2$CH$_2$, and the like. Y also stands for a 2-oxa- or 2-thia-1,3-propylene group having from two to four carbon atoms, for example, —CH$_2$OCH$_2$—,

—CH$_2$SCH$_2$—

—CH—SO—CH$_2$, —CH$_2$—SO$_2$—CH$_2$—,

—CH(CH$_3$)OCH$_2$—

—CH(CH$_3$)OCH(CH$_3$)—, and the like. The group Y' in Formula B can be identical with the group Y of Formula A, but it is not limited to a two or three carbon bridge and may have up to eight carbons separating the carbonyl and carboxyl groups.

The compounds of Formula A are prepared by heating a compound of the formula

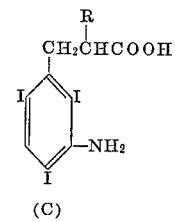

(C)

with a dibasic anhydride of the formula

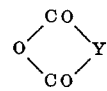

wherein R and Y have the meanings given hereinabove. In carrying out the reaction, the reactants are mixed together and heated together at a temperature between about 75° and 200° C. until reaction is complete as indicated by thin layer chromatography. In the case where Y is an uninterrupted lower-alkylene group, the reaction is preferably carried out in the presence of a strong acid catalyst, for example, sulfuric acid or phosphoric acid.

The compounds of Formula B where Y' is within the scope of Y, and R' and R'' are hydrogen, can be prepared by alkaline hydrolsis of the corresponding compounds of Formula A. The reaction takes place in aqueous solution under mild conditions, at room temperature.

The cmpounds of Formula B can alternatively be prepared by reacting a compound of Formula C with a half ester half acid chloride, Cl—CO—Y'—CO—OR'', in an inert solvent, affording first a compound of Formula B where R'' is lower-alkyl. Hydrolysis of the latter under mild alkaline conditions gives an anilic acid of Formula B where R' and R'' are hydrogen.

The compounds of Formula B wherein R' is lower-alkyl or hydroxyl-lower-alkyl can be prepared by N-alkylation of the corresponding compounds wherein R' is hydrogen. The alkylation is effected by the action of a lower-alkyl or hydroxy-lower-alkyl halide, sulfate, alkylsulfonate or arylsulfonate in the presence of aqueous alkali.

The compounds of the invention of Formulas A and B where Y and/or Y' are alkylene groups interrupted by SO or SO$_2$ can alternatively be prepared by oxidation of the corresponding sulfide (—S—) compounds with a peracid. The oxidation takes place at room temperature in an inert organic solvent.

The structures of the compounds of the invention were determined by the modes of synthesis, by elementary analysis and by neutral equivalent determinations. The course of the reactions was followed by thin-layer chromatography.

The compounds of the invention, being carboxylic acids, can be obtained in the form of salts derived from inorganic bases or organic amines. The compounds of Formula B where R" is hydrogen, being dibasic acids, can form mono- or di-salts. Preferred salts are those which are pharmaceutically acceptable, for example, the sodium, magnesium, calcium and N-methylglucamine salts, although all salts are useful either as characterizing derivaties or as intermediates in the purification of the acids.

The compounds of the invention having the Formulas A and B are useful as X-ray contrast media for visualization of the gallbladder (cholecystography). The compounds have intravenous toxicity (approximate $LD_{50}$ values) in the range between about 600 and about 3000 mg./kg. in mice. The compounds of lesser toxicity, $LD_{50}=1500$ mg./kg. or greater, are primarily useful, in the form of their water-soluble, pharmaceutically acceptable salts, as intravenous cholecystographic agents. The compounds having $LD_{50}$ values less than about 1500 mg./kg. are primarily useful, either in the free acid or salt form, as oral cholecystographic agents The actual quantitative determination of toxicity and radiopaque effectiveness for a particular compound is readily determined by standard test procedures by technicians trained in pharmacological test procedures, without the need for any extensive experimentation.

The compounds were tested for their intravenous cholecystographic efficacy by standard procedure as follows: The test compound was injected intraveously in the form of an aqueous solution of the sodium or N-methylglucamine salt to cats. Each cat was X-rayed at hourly intervals and the roentgenograms examined and evaluated. The density of the gallbladder shadows was interpreted in accordance with a numerical scoring plane designated as the Cholecystographic Index (CI), a measure of the efficiency of the test compound, viz: (0 (none), 1 (poor), 2 (fair), 3 (good), 4 (excellent) [see J. O. Hoppe, J. Am. Pharm. Assoc., Sci. Ed. 48, 368–79 (1959)].

In testing for oral cholecystography, the test compound was administered orally in capsules to each of five cats. About eighteen hours later, each cat was X-rayed and the roentgenograms were examined. The density of the gallbladder shadow evoked by the test compound in each cat was interpreted in accordance with the above numerical scoring plan and the Average Cholecystographic Index (ACI) determined.

The compounds of the invention, upon testing for cholecystographic effectiveness in cats at a dose level of 100 mg./kg., were found to produce gallbladder shadows having a Cholecystographic Index of 3.0–4.0 either by oral or by intravenous administration.

The compounds of the invention are prepared for cholecystographic use by dissolving a pharmaceutically acceptable salt form in sterile aqueous medium suitable for intravenous injection; or in capsule or in tablet form with conventional excipients for oral administration.

The following examples will further illustrate the invention.

EXAMPLE 1

α-Ethyl-3-glutarimido-2,4,6-triiodohydrocinnamic acid [A; R is $C_2H_5$, Y is $CH_2CH_2CH_2$]

3-amino-α-ethyl-2,4,6-triiodohydrocinnamic acid (40 g.) and 64 g. of glutaric anhydride were ground together and heated gradually on a steam bath to 100° C. over a period of thirteen minutes. Concentrated sulfuric acid (10 drops) was then added, the mixture heated 37 minutes at 100° C., 10 drops more of sulfuric acid added, and the mixture heated 5 hours at 100° C. and then poured into water. After three days, the solid product was collected by filtration and dissolved in warm benzene. The benzene solution was decolorized with activated charcoal, concentrated to 350 ml. and cooled to room temperature, whereupon there separated 7.6 g. of glutaric acid. The latter was removed by filtration and the filtrate concentrated to dryness. The residue was recrystallized from isopropyl alcohol to give 21.75 g. of α-ethyl-3-glutarimido-2,4,6-triiodohydrocinnamic acid as a white solid which upon heating shrinks at about 93° C., gradually softens and melts with bubbling at 120° C.

α-Ethyl-3-glutarimido-2,4,6-triiodohydrocinnamic acid was found to have an intravenous toxicity (approximate $LD_{50}$) = 595 mg./kg. in mice, and Average Cholecystographic Index (ACI) = 3.4 when administered orally to cats at a dose level of 100 mg./kg.

By replacing the glutaric anhydride in the foregoing preparation by a molar equivalent amount of succinic anhydride, 2,3-dimethylsuccinic anhydride, 2,3,4-trimethylglutaric anhydride or 2-methylglutaric anhydride, there can be obtained, respectively, α-ethyl-3-succinimido-2,4,6-triiodohydrocinnamic acid [A; R is $C_2H_5$, Y is $CH_2CH_2$], α-ethyl-3-(2,3-dimethylsuccinimido) - 2,4,6 - triiodohydrocinnamic acid [A; R is C $H_5$, Y is $$CH(CH_3)CH(CH_3)]$$

α-ethyl-3-(2,3,4-trimethylglutarimido - 2,4,6 - triiodohydrocinnamic acid [A; R is $C_2H_5$, Y is $$CH(CH_3)CH(CH_3)CH(CH_3)]$$

α-ethyl-3-(2-methylglutarimido) - 2,4,6 - triiodohydrocinnamic acid [A; R is $C_2H_5$, Y is $CH(CH_3)CH_2CH_2$].

By replacing the glutaric anhydride in the foregoing preparation by a molar equivalent amount of 3-oxaglutaric anhydride or 3-thiaglutaric anhydride, but omitting the sulfuric acid, there can be obtained, respectively, α-ethyl-3-(diglycolimido)-2,4,6-triiodohydrocinnamic acid [A; R is $C_2H_5$, Y is $CH_2OCH_2$], or α-ethyl-3-(3,5-dioxothiomorpholino)-2,4,6-triiodohydrocinnamic acid [A; R is $C_2H_5$, Y is $CH_2SCH_2$]. The latter compound can be oxidized with m-chloroperbenzoic acid in dimethylformamide solution to produce first α-ethyl-3-(3,5,S-trioxothiomorpholino)-2,4,6-triiodohydrocinnamic acid [A; R is C $H_5$, Y is $CH_2SOCH_2$], and then α-ethyl-3-(3,5,S,S-tetraoxothiomorpholino) - 2,4,6 - triiodohydrocinnamic acid [A R is $C_2H_5$, Y is $CH_2SO_2CH_2$].

By replacing the 3-amino-α-ethyl-2,4,6-triiodohydrocinnamic acid in the foregoing preparation by a molar equivalent amount of 3-amino-2,4,6-triiodohydrocinnamic acid, 3-amino-α-methyl-2,4,6-triiodohydrocinnamic acid, 3-amino-α-(n-hexyl)-2,4,6-triiodohydrocinnamic acid, or 3-amino-α-phenyl-2,4,6-triiodohydrocinnamic acid, there can be obtained, respectively, 3-glutarimido-2,4,6-triiodohydrocinnamic acid [A; R is H, Y is $CH_2CH_2CH_2$], α-methyl-3-glutarimido-2,4,6-triiodohydrocinnamic acid [A; R is $CH_3$, Y is $CH_2CH_2CH_2$], α-(n-hexyl)-3-glutarimido-2,4,6-triiodohydrocinnamic acid [A; R is $C_6H_{13}$, Y is CH $CH_2CH_2$], or α-phenyl-3-glutarimido-2,4,6-triiodohydrocinnamic acid [A; R is $C_6H_5$, Y is $CH_2CH_2CH_2$].

EXAMPLE 2

3'-(2-carboxybutyl)-2',4',6'-triiodosuccinanilic acid [B; R is $C_2H_5$, R' and R" are H, Y' is $CH_2CH_2$]

A mixture of 28.5 g. of 3-amino-α-ethyl-2,4,6-triiodohydrocinnamic acid and 70.65 g. of succinic anhydride was stirred and heated at 140–149° C. After about 80% of the mixture had melted, 4.7 ml. of concentrated sulfuric acid was added, and stirring was continued for seven minutes at 143–147° C. The reaction mixture containing α-ethyl - 3 - succinimido-2,4,6-triiodohydrocinnamic acid was then cooled and added to excess dilute sodium hydroxide solution. The alkaline mixture was allowed to stand for two days at room temperature and then acidified with 6 N hydrochloric acid. The viscous mass which separated was collected, dissolved in dilute sodium hydroxide solution, decolorized with activated charcoal and reprecipitated with 3 N hydrochloric acid. The product was collected and triturated with 200 ml. of acetone. The acetone extracts were treated with 200 ml. of benzene, and fractions of solid product were obtained by gradual concentration of the acetone-benzene solution. The fraction melting at 167–173° C. (15.4 g.) was recrystallized from acetonitrile and from acetone-benzene to give 3'-(2- carboxybutyl) - 2',4',6' - triiodosuccinanilic acid, M.P. 167.5–173.5° C.

3' - (2 - carboxybutyl) - 2',4(,6' - triiodocuccinanilic acid was found to have an intravenous toxicity (approximate LD$_{50}$)=300 mg./kg. in mice, and maximum CI=3.5–4.0 when administered intranvenously to cats at a dose level of 100 mg./kg.

EXAMPLE 3

3'-(2-carboxybutyl)-2',4',6'-triiodoglutaranilic acid [B; R is C$_2$H$_5$, R' and R" are H, Y' is CH$_2$CH$_2$CH$_2$]

A mixture of 57.1 g. of 3-amino-α-ethyl-2,4,6-triiodohydrocinnamic acid and 91.2 g. of glutaric anhydride was heated on a steam bath to 100° C., 3.0 ml. of concentrated sulfuric acid added, and the mixture heated two hours at 100° C. The reaction mixture was poured into 700 ml. of water. The product containing α-ethyl-3-glutarimido-2,4,6-triiodohydrocinnamic acid was collected and dissolved in warm, dilute sodium hydroxide solution. The alkaline solution was filtered and acidified with 6 N hydrochloric acid. The free acid was collected and dissolved in 600 ml. of heat acetic acid, the solution filtered and 400 ml. of ethyl acetate added, whereupon the product crystallized from solution. The product was recrystallized in the same manner from acetic acid-ethyl acetate to give 3'-(2-carboxybutyl)-2',4',6'-trriodoglutaranilic acid, colorless prisms, M.P. 213–218° C.

3' - (2 - carboxybutyl) - 2',4',6'-triiodoglutaranilic acid was found to have an intravenous toxicity (approximately LD$_{50}$)=2200 mg./kg. in mice, and maximum CI=3.5 whene administistered to cats at a dose level of 100 mg./kg.

By replacing the glutaric anhydride in the foregoing preparation by a molar equivalent amount of 2,3-dimethylsuccinic anhydride, 2,3,4-trimethylglutaric anhydride, or 3-methylglutaric anhydride, there can be obtained, respectively, 3'-(2-carboxybutyl)-2',4',6'-triiodo-2,3-dimethylglutaranilic acid [B; R is C$_2$H$_5$, R' and R" are H, Y' is CH(CH$_3$)CH(CH$_3$)CH$_2$], 3'-(2-carboxybutyl) - 2',4,6' - triiodo - 2,3,4-trimethylglutaranilic acid [B; R is C$_2$H$_5$, R' and R" are H, Y' is

CH(CH$_3$)CH(CH$_3$)CH(CH$_3$)]

or 3' - (2 - carboxybutyl) - 2',4',6'-triiodo-3-methylglutaranilic acid [B; R, is C$_2$H$_5$, R' and R" are H, Y' is CH$_2$CH(CH$_3$CH$_2$].

By replacing the glutaric anhydride in the foregoing preparation by a molar equivalent amount of 3-oxaglutaric anhydride or 3-thiaglutaric anhydride, but omitting the sulfuric acid, there can be obtained, respectively, 3' - (2 - carboxybutyl)-2',4',6'-triiodo-3-oxaglutaranilic acid [B; R is C$_2$H$_5$, R' and R" are H, Y is CH$_2$OCH$_2$], or 3' - (2 - carboxybutyl)-2',4',6'-triiodo-3-thiaglutaranilic acid [B; R is C$_2$H$_5$, R' and R" are H, Y is CH$_2$SCH$_2$]. The latter compound can be oxidized with m-chloroperbenzoic acid in dimethylforamide solution to produce first 3'-(2-carboxybutyl) - 2',4',6' - triiodo-S-oxo-3-thiagultaranilic acid [B; R is C$_2$H$_5$, R' and R" are H, Y is CH$_2$SOCH$_2$], and then 3' - (2 - carboxybutyl) - 2',4',6'-triiodo-S,S-dioxo-3-thiaglutaranilic acid [B; R is C$_2$H$_5$, R' and R" are H, Y is CH$_2$SO$_2$CH$_2$].

By replacing the 3-amino-α-ethyl-2,4,6-triiodohydrocinnamic acid in the foreoging preparation by a molar equivalent amount of 3-amino-2,4,6,-triiodohydrocinnamic acid, 3-amino-α-methyl-2,4,6-triiodohydrocinnamic acid, 3 - amino - α-(n-hexyl)-2,4,6-triiodohydrocinnamic acid, or 3 - amino - α-phenyl-2,4,6-triiodohydrocinnamic acid, there can be obtained, respectively, 3'-(2-carboxyethyl)-2', 4', 6'-triiodoglutaranilic acid [B; R, R' and R" are H, Y' is CH$_2$CH$_2$CH$_2$], 3'-(2-carboxypropyl)-2',4',6'-triiodoglutaranilic acid [B; R is CH$_3$, R' and R" are H, Y' is CH$_2$CH$_2$CH$_2$], 3' - (2-carboxy-n-octyl)-2',4',6'-triiodoglutaranilic acid [B; R is C$_6$H$_{13}$, R' and R" are H, Y'  is CH$_2$CH$_2$CH$_2$], or 3'-(2-carboxy-2-phenylethyl)-2',4'-6'- triiodoglutaranilic acid [B; R is C$_6$H$_5$, R' and R" are H, Y' is CH$_2$CH$_2$CH$_2$].

All of the foregoing anilic acid derivatives can also be obtained by mild alkaline hydrolysis of the corresponding cyclic imides described above under Example 1.

EXAMPLE 4

(a) Methyl 3' - (2 - carboxybutyl) - 2',4',6'-triiodoadipanilate [B; R is C$_2$H$_5$, R' is H, R" is CH$_3$, Y' is CH$_2$CH$_2$CH$_2$CH$_2$] can be parpared by heating 3-amino-α-ethyl-2,4,6-triiodohydrocinnamic acid with 5-carbomethoxyvaleryl chloride

(CH$_3$OCOCH$_2$CH$_2$CH$_2$CH$_2$COCl)

in dioxane solution.

(b) 3' - (2 - carboxybutyl) - 2',4',6'-triiodoadipanilic acid [B; R is C$_2$H$_5$, R' and R" are H, Y' is

CH$_2$CH$_2$CH$_2$CH$_2$]

can be prepared by hydrolysis of the foregoing methyl ester by heating it with potassium carbonate in methanol solution.

Similarly 3 - amino-α-ethyl-2,4,6-triiodohydrocinnamic acid can be caused to react with

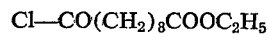Cl—CO(CH$_2$)$_8$COOC$_2$H$_5$

Cl—COCH$_2$CH$_2$OCH$_2$CH$_2$COOCH$_3$

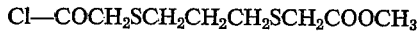Cl—COCH$_2$SCH$_2$CH$_2$CH$_2$SCH$_2$COOCH$_3$ or

Cl—COCH$_2$OCH$_2$CH$_2$OCH$_2$CH$_2$OCH$_2$COOCH$_3$ to give, respectively, the following compounds: [B; R is C$_2$H$_5$, R' is H, R" is C$_2$H$_5$, Y' is (CH$_2$)$_8$]; [B; R is C$_2$H$_5$, R' is H, R" is CH$_3$, Y' is CH$_2$CH$_2$OCH$_2$CH$_2$]; [B; R is C$_2$H$_5$ R' is H, R" is CH$_3$, Y" is

CH$_2$SCH$_2$CH$_2$CH$_2$CH$_2$SCH$_2$]

or [B; R is C$_2$H$_5$, R' is H, R" is CH$_3$, Y' is

CH$_2$OCH$_2$CH$_2$OCH$_2$CH$_2$OCH$_2$]

which in turn can be hydrolyzed to corresponding dibasic acids where R" is H. The compound [B; R is C$_2$H$_5$, R' and R" are H, Y' is CH$_2$SCH$_2$CH$_2$CH$_2$CH$_2$SCH$_2$] can be oxidized with m-chloroperbenzoic acid in dimethylformamide solution to produce first the compound [B; R is C$_2$H$_5$, R' and R" are H, Y' is

CH$_2$SOCH$_2$CH$_2$CH$_2$CH$_2$SOCH$_2$]

and then the compound [B; R is C$_2$H$_5$, R' and R" are H, Y' is CH$_2$SO$_2$CH$_2$CH$_2$CH$_2$SO$_2$CH$_2$].

EXAMPLE 5

3' - (2-carboxybutyl)-2',4',6'-triiodo-N-methylsuccinanilic acid [B; R is C$_2$H$_5$, R' is CH$_3$, R" is H, Y' is CH$_2$CH$_2$]

A solution of 11.33 g. (8.4 ml.) of dimethyl sulfate in 15 ml. of acetone was added dropwise over a 30 minute period to a stirred solution of 33.5 g. of 3'-(2-carboxybutyl)-2',4',6'-triiodosuccinanilic acid (Example 2) in 80 ml. of 10% aqueous sodium hydroxide. The reaction mixture was stirred overnight at room temperature and then acidified with 6 N hydrochloric acid. The viscous product was separated and triturated with 300 ml. of acetone. The acetone extracts were diluted with 300 ml. of benzene, and the mixture was concentrated while adding more benzene until the acetone was largely removed. The product which separated was crystallized by trituration with n-hexane and dried in a vacuum oven at 62° C. for three days to give 3'-(2-carboxybutyl) - 2',4',6' - triiodo-N-methylsuccinanilic acid, M.P. 95–107° C. The latter product was dissolved in methanol and the solution treated with an excess of aqueous sodium hydroxide. Anhydrous ether was added and there separated from solution 3'-(2-carboxybutyl)-2',4', 6'-triiodo-N-methylsuccinanilic acid in the form of its disodium salt, M.P. 251–252° C. (dec.).

3′-(2-carboxybutyl)-2′,4′,6′-triiodo-N-methylsuccinanilic acid was found to have an intravenous toxicity (approximate LD$_{50}$)=1500 mg./kg. in mice, and maximum CI=4.0 when administered intravenously to cats at a dose level of 100 mg./kg.

Similarly 3′-(2-carboxybutyl)-2′,4′,6′-triiodoglutaranilic acid (Example 3) was N-methylated to give 3′-(2-carboxybutyl)-2′,4′,6′-triiodo-N-methylglutaranilic acid [B; R is C$_2$H$_5$, R′ is CH$_3$, R″ is H, Y′ is CH$_2$CH$_2$CH$_2$], M.P. 160–165° C. when recrystallized from an isopropyl alcohol-methanol mixture.

EXAMPLE 6

3′-(2-carboxybutyl)-N-ethyl-2′,4′,6′-triiodosuccinanilic acid [B; R is C$_2$H$_5$, R′ is C$_2$H$_5$, R″ is H, Y′ is CH$_2$CH$_2$] was prepared from 33.5 g. of 3′-(2-carboxybutyl)-2′,4′,6′-triiodosuccinanilic acid (Example 2) and 13.88 g. of diethyl sulfate in sodium hydroxide solution according to the procedure described above in Example 5. The product was obtained in the form of its disodium salt, M.P. 214–219° C. (dec.).

3′-(2-carboxybutyl)-N-ethyl-2′,4′,6′-triiodosuccinanilic acid was found to have an intravenous toxicity (approximate LD$_{50}$)=750 mg./kg. in mice, CI=2.4 when administered orally to cats at a dose level of 100 mg./kg., and maximum CI=4.0 when administered intravenously to cats at a dose level of 100 mg./kg.

By replacing the dimethyl sulfate or diethyl sulfate in Examples 5 and 6 by a molar equivalent amount of 2-hydroxyethyl bromide there can be obtained 3′-(2-carboxybutyl)-2′,4′,6′-triiodo-N-(2-hydroxyethyl)succinanilic acid [B; R is C$_2$H$_5$, R′ is CH$_2$CH$_2$OH, R″ is H, Y′ is CH$_2$CH$_2$].

I claim:
1. A compound of the formula

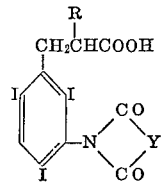

wherein R is hydrogen, lower-alkyl or phenyl; and Y is a lower-alkylene group of from two to six carbon atoms wherein two or three carbon atoms separate the carbonyl groups.

2. A compound according to claim 1 wherein R is ethyl.

3. α-Ethyl-3-glutarimido-2,4,6-triiodohydrocinnamic acid, according to claim 2 wherein Y is CH$_2$CH$_2$CH$_2$.

4. α-Ethyl-3-succinimido-2,4,6-triiodohydrocinnamic acid, according to claim 2 wherein Y is CH$_2$CH$_2$.

References Cited

UNITED STATES PATENTS

| | | | |
|---|---|---|---|
| 2,895,988 | 7/1959 | Archer et al. | 260—518 |
| 3,359,278 | 12/1967 | Wallingford | 260—326.5 |
| 3,446,837 | 5/1969 | Wallingford | 424—5 X |
| 3,452,084 | 6/1969 | Ackerman | 424—5 X |

DONALD G. DAUS, Primary Examiner

U.S. Cl. X.R.

260—243 B, 247.2 A, 306.7, 307 F, 326.5 FM, 470, 471 R, 518 A; 424—5

UNITED STATES PATENT OFFICE
CERTIFICATE OF CORRECTION

Patent No. 3,655,669 (S.N. 827,954) Dated April 11, 1972

Inventor(s) James H. Ackerman

It is certified that error appears in the above-identified patent and that said Letters Patent are hereby corrected as shown below:

Column 1, line 69, "-CH-CH($C_2H_5$)$CH_2$-" should read -- -$CH_2$CH($C_2H_5$)$CH_2$- --.

Column 2, line 6, "-CH-SO-$CH_2$," should read -- -$CH_2$-SO-$CH_2$-, --.

Column 3, line 32, "plane" should read --plan--.

Column 4, line 16, "C $H_5$" should read --$C_2H_5$--; line 36, "C $H_5$" should read --$C_2H_5$--; line 50, "CH $CH_2CH_2$" should read --$CH_2CH_2CH_2$--.

Column 5, line 3, "2',4(,6'-triiodocuccinanilic" should read --2',4',6'-triiodosuccinanilic--; line 5, "300" should read --3000--; line 46, "$CH_2$CH($CH_3CH_2$]." should read --$CH_2$CH($CH_3$)$CH_2$].--; line 57, "dimethyloramide" should read --dimethylformamide--.

Column 6, line 27, "Cl-COCH$_2$SCH$_2$CH$_2$CH$_2$SCH$_2$COOCH$_3$" should read --Cl-COCH$_2$SCH$_2$CH$_2$CH$_2$CH$_2$SCH$_2$COOCH$_3$--.

Signed and sealed this 19th day of September 1972.

(SEAL)
Attest:

EDWARD M. FLETCHER, JR.
Attesting Officer

ROBERT GOTTSCHALK
Commissioner of Patents